Figure 1:
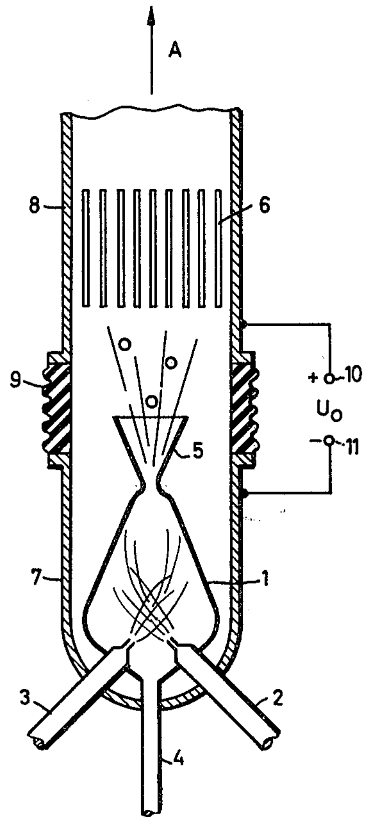

310-11 SR CROSS REFERENCE SEARCH ROOM
FIP8502 XR 3,176,166

March 30, 1965 KARL-GEORG GÜNTHER ET AL 3,176,166

THERMIONIC GENERATOR

Filed July 25, 1962

United States Patent Office 3,176,166
Patented Mar. 30, 1965

3,176,166
THERMIONIC GENERATOR

Karl-Georg Günther, Nurnberg, and Walter Hänlein, Erlangen, Germany, assignors to Siemens-Schuckertwerke Aktiengesellschaft, Berlin-Siemensstadt and Erlangen, Germany, a corporation of Germany Filed July 25, 1962, Ser. No. 212,775
Claims priority, application Germany, July 27, 1961, S 75,023
13 Claims. (Cl. 310—4)

Our invention relates to a thermionic energy converter of the type described in our copending application Serial No. 162,789, filed December 28, 1961, now issued as Patent No. 3,120,621, assigned to the assignee of the present invention, and has for its object to devise a converter capable of furnishing relatively high voltages and relatively high currents of the magnitude require for utility power lines, for example voltages of 100 volts or more at hundreds of kilowatts.

A thermionic energy converter of the type here involved operates in the following manner. The heat to be converted directly into electricity is used for heating a mixture of a driving gas or vapor and a readily ionizable metal addition finely distributed in the driving medium, the metal addition consisting preferably of at least one metallic element from the lithium subgroup in the first group of the periodic system of elements (Li, Na, K, Rb, Cs). The mixture of gaseous driving medium and metal vapor passes through a circulatory path. The metal addition is contact-ionized on a metallic cathode. The ions of the metal, traveling from the two cathode to the anode, become electrically discharged at the anode. Thereafter the driving gas or vapor with the metal addition is compressed and recirculated back to the beginning of the circulation, the generated electrical energy being taken off between cathode and anode. This constitutes a circulation or closed system.

With respect to further features and operational details of such energy converters, these features and details being also applicable in conjunction with the present invention described in the following, reference may be had to the above-mentioned copending application.

It is a more specific object of our present invention to improve energy converters of the above-mentioned type toward a simplified design and performance with resulting advantages with respect to reduction in operating cost and reliability.

To this end, and in accordance with a feature of our invention, we provide an "open" system. That is to say we supply combustion gas, consisting of a mixture of fuel and oxygen, into the active space of the thermionic diode or reaction chamber or converter proper so as to produce much or substantially all of the heat to be converted directly at or within the cathode structure of the converter; and we further add the above-mentioned, readily ionizable metal in finely distributed form directly to the combustion gas. The metal addition then becomes contact-ionized at the metallic cathode preferably designed as a Laval nozzle whereafter the ions of the metal addition become electrically discharged at the anode with the result that an electric voltage is generated between the anode and cathode. The above-mentioned fuel may consist of fuel oil or other hydrocarbons or hydrogen, and the oxygen may be supplied in substantially pure form or by adding air, for example. With the above combustion gas, the above-mentioned metal addition need not consist of elemental substance but is preferably constituted by metal salt solutions, for example of cesium chloride potassium chloride, sodium chloride (CsCl, KCl, NaCl), or the corresponding carbonates, oxides or other halogen compounds of these metals. Oil for example, is a suitable solvent. The metal-salt solutions are brought to the desired finely distributed form by suitable disintegration or atomization preferably with the aid of ultrasonics. This can be done outside of the diode space prior to adding the metal component to the combustible gases, or also within the diode or reaction chamber. Also applicable are pulverized metal-containing substances which are blown into the reaction chamber of the diode by means of a driving gas under pressure. An inactive driving gas such as argon may be used. However, one of the chemically reacting gases such as hydrogen or another fuel gas may be used for this purpose.

The converter plant may further be equipped with additional devices which utilize the heat still contained in the exit gases issuing from the thermionic converter after electric discharge of the metal ions.

Instead of introducing the fuel substances with the oxygen addition directly into the reaction chamber, the reaction chamber may be heated from the outside by combustion of the fuel with oxygen addition, thus causing a gas and/or vapor-containing mixture in the reaction chamber of the diode to be heated together with the Laval nozzle that constitutes the cathode, the mixture being passed through a circulatory path in which it is subjected to compression or condensation as more fully described in our above-mentioned copending application Serial No. 162,789, now issued as Patent No. 3,120,621. The converter plant may also be such that the metal addition, alone or with other components, performs a free-circulating travel of this kind. Also applicable are devices which alternately impede or release the gas flow in the circulatory system, thus periodically varying or cyclically reversing the gas flow for the purpose of directly generating a periodic or alternating output voltage. This can be done by exciting acoustic oscillations in the gas flow or by means of mechanical control devices, also as more fully described and illustrated in the copending application.

Figure 2:
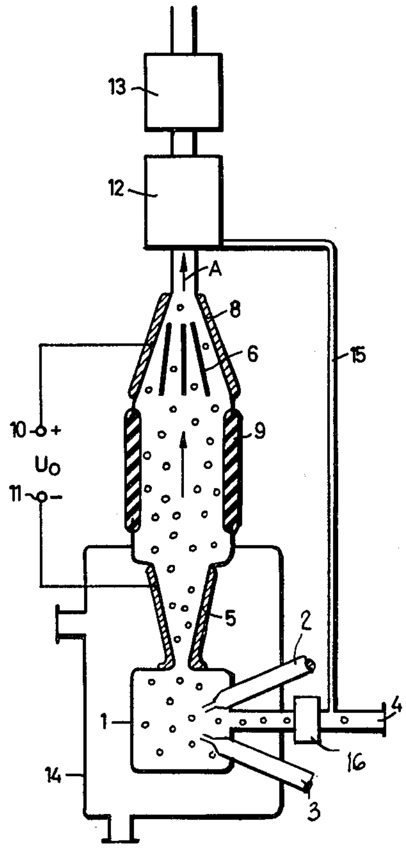

The invention will be further described with reference to the embodiments of the invention illustrated by way of example on the accompanying drawings wherein FIGS. 1 and 2 show schematically in section two embodiments of a thermionic energy converter according to the invention by way of example.

In FIG. 1 the reaction chamber 1 of the illustrated thermionic converter contains a hollow cathode structure 5 of refractory metal shaped as a Laval nozzle. The cathode 5 consists of platinum. However, molybdenum or tungsten may also be used if the driving gas used does not contain oxidizing constituents, as is the case when employing argon for this purpose. The rear portion of the cathode structure 5 is widened to form a combustion chamber and communicates with three supply tubes 2, 3 and 4. The tubes 2 and 3 serve for feeding the chemically reacting gases into the combustion space. Thus, hydrogen or other fuel gas is supplied through tube 2 and oxygen is supplied through tube 3. The metallic addition to be ionized is supplied through the tube 4 and consists of one of the above-mentioned metal salts, preferably CsCl or KCl. These salts are driven into the combustion chamber after being disintegrated into fine particles by an ultrasonic atomizer. The salts can also be introduced in pulverulent form by means of a pressure gas or in form of a vapor from an evaporator. The pressure or driving gas may consist of the above-mentioned argon, although one of the chemically reacting gases, such as hydrogen, may also serve to entrain the metal salt into the combustion chamber in which the tube 4 need not be provided or, if present, can be closed.

The Laval nozzle at the outlet of the reaction or combustion chamber 1 causes the metal to become ionized as it passes, together with the issuing jet of gas and vapor, through the nozzle opening and enters into contact with the nozzle surface. The ions become discharged at a number of guide sheets 6 of metal which are constituted by planar plates although the invention contemplates other structures, for example cylindrical structures. The envelope of the converter diode comprises two electrically conducting portions 7 and 8 consisting preferably of stainless steel, which are joined with each other by an intermediate cylinder 9 of electrically insulating material such as sintered alumina. The cathode structure is electrically connected by means of the tubes 2, 3 and 4 with the envelope portion 7, and the guide sheets 6, constituting the anode of the converter, are electrically connected with the envelope portion 8. The generated direct voltage $U_0$ is available between output terminals 10 and 11, the positive terminal 10 being connected to the envelope portion 8 and the negative terminal 11 to the envelope portion 7. The value of the voltage between terminals 10 and 11 is approximately 100 volts. The apparatus is capable of delivering up to hundreds of kilowatts.

The electrically discharged gaseous medium leaving the diode or converter in the direction of the arrow A still contains sufficient heat that can be utilized in additional energy converter stages or for other useful purposes (as exemplified in more detail in the above-mentioned copending application).

Thus in the converter according to the above-mentioned copending application Serial No. 162,789, filed December 28, 1961, now issued as Patent No. 3,120,621, the combustion gases heat the driving gas or the driving vapor by way of a circulating system in an oven-like housing. By contrast according to the present invention, in its simplest form, the combustion gas and driving gas are identical. That is to say the heating source exists in the interior of the apparatus so that no heat transfer takes place at this location. This results in an increased heating efficiency. However the ion forming material is lost. In this simplest case the supply tubes 2 and 3 may be dispensed with.

FIG. 2, wherein like numerals refer to members having the same function as FIG. 1, illustrates an open system having an oven-like apparatus 14. The metal nevertheless is returned or recirculated in the conductor 15 after condensation in the cooler 12. The cooler 12 may also serve for energy conversion although according to FIG. 2 this is accomplished by the additional cooler 13.

The converter can also be modified in such a manner that the combustion heat of the chemically reacting substances causes the reaction chamber 1 and Laval nozzle 5 to be heated from the outside by means of surrounding chamber 14, thus producing and/or heating in the reaction chamber a gas and/or vapor-containing mixed medium which is passed through a circulatory path as described in the copending application.

As stated the materials used for the cathode 5 and anode 6 correspond with those used in the above-mentioned copending application Serial No. 162,789, filed December 28, 1961, now issued as Patent No. 3,120,621. This is true with regard to the structure of the anode and cathode as well as their active surface coatings.

The salts may be driven through tube 4 by driving means connected to tube 4 but not shown. An ultrasonic apparatus 16, of known type, may be installed in pipe 4 to reduce the salts to finely distributed form.

It will be obvious to those skilled in the art that the invention may be otherwise embodied within the scope of the following claims.

We claim:

1. A thermionic energy converter comprising a low-pressure vessel having a cathode and an anode insulated and spaced from each other, said cathode forming heating chamber means, conduit means for introducing directly into said heating chamber means a mixture of a fluid driving and heating medium and an ionizable metal addition finely distributed in said medium, said cathode and anode having respective active surface areas contactable by said mixture, whereby said mixture is heated in said chamber means for driving it toward said anode, and whereby said metal addition is ionized when contacting said cathode and the ions are thereafter electrically discharged when contacting said anode, two electric terminals connected to said anode and cathode respectively to provide electric energy, and exhaust means located beyond said anode for exhausting at least a portion of said medium.

2. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, combustion gas supply means for supplying fuel and oxygen to said combustion chamber means so as to heat the mixture of finely distributed ionizable metal and fluid medium, said cathode being shaped to direct said mixture toward said anode, whereby said metal addition is ionized when contacting said cathode and the ions are thereafter electrically discharged when contacting said anode, two electrical terminals connected to said anode and cathode respectively to provide electric energy, and exhaust means located beyond said anode for exhausting at least a portion of said medium.

3. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, combustion gas supply means for supplying fuel and oxygen to said combustion chamber means so as to heat the mixture of finely distributed ionizable metal and fluid medium, said cathode having the shape of a Laval nozzle to direct said mixture toward said anode, whereby said metal addition is ionized when contacting said cathode and the ions are thereafter electrically discharged when contacting said anode, two electric terminals connected to said anode and cathode respectively to provide electric energy, and exhaust means located beyond said anode for exhausting at least a portion of said medium.

4. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, combustion gas supply means for supplying fuel and oxygen to said combustion chamber means so as to heat the mixture of finely distributed ionizable metal and fluid medium, said cathode being shaped to direct said mixture toward said anode, whereby said metal addition is ionized when contacting said cathode and the ions are thereafter electrically discharged when contacting said anode, two electric terminals connected to said anode and cathode respectively to provide electric energy, said metal additions including a dissolved metal salt selected from the group consisting of the carbonates, oxides and halides of cesium, potassium and sodium and mixtures thereof, and exhaust means located beyond said anode for exhausting at least a portion of said medium.

5. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, combustion gas supply means for supplying fuel and oxygen to said combustion chamber means so as to heat the mixture of finely distributed ionizable metal and fluid medium, said cathode being shaped to direct said mixture toward said anode, whereby said metal addition is ionized when contacting said cathode and the ions are thereafter electrically discharged when contacting said anode, two electric terminals connected to said anode and cathode respectively to provide electric energy, said metal additions including a dissolved metal salt in finely distributed form and selected from the group consisting of the carbonates, oxides and halides of cesium, potassium and sodium and mixtures thereof, and exhaust means located beyond said anode for exhausting at least a portion of said medium.

6. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, combustion gas supply means for supplying fuel and oxygen to said combustion chamber means so as to heat the mixture of finely distributed ionizable metal and fluid medium, said cathode being shaped to direct said mixture toward said anode, whereby said metal addition is ionized when contacting said cathode and the ions are thereafter electrically discharged when contacting said anode, two electric terminals connected to said anode and cathode respectively to provide electric energy, said metal additions including a dissolved metal salt selected from the group consisting of the carbonate, oxides and halides of cesium, potassium and sodium and mixtures thereof, said conduit means including driving means for blowing said metal addition into said chamber means, and exhaust means located beyond said anode for exhausting at least a portion of said medium.

7. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, said active surface area of said cathode having a work function higher than the ionizing function of said metal addition, said active surface area of said anode having a work function lower than said ionizing function, said combustion chamber means forming heating means thermally joined with said vessel for heating said mixture and driving it toward said anode, whereby said metal addition is ionized when contacting said cathode and the ions are thereafter electrically discharged when contacting said anode, two electric terminals connected to said anode and cathode respectively to provide electric energy, said mixture driven by said conduit means including combustion gases, and exhaust means located beyond said anode for exhausting at least a portion of said medium.

8. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, said conduit means including combustion gas supply means for supplying fuel and oxygen to said combustion chamber means so as to heat the mixture of finely distributed ionizable metal and fluid medium, said cathode being shaped to direct said mixture toward said anode, whereby said metal addition is ionized when contacting said cathode and the ions are thereafter electrically discharged when contacting said anode, two electric terminals connected to said anode and cathode respectively to provide electric energy, and exhaust means located beyond said anode for exhausting at least a portion of said medium, and energy conversion means connected to the anode side of said converter in said exhaust means for utilizing the heat content of the gas passing the anode.

9. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, whereby said mixture is heated by said medium within said cathode for driving said mixture toward said anode, and whereby said metal addition is ionized when contacting said cathode and the ions are thereafter electrically discharged when contacting said anode, two electric terminals connected to said anode and cathode respectively to provide electric energy, an auxiliary heating compartment surrounding said heating chamber means and exhaust means located beyond said anode for exhausting at least a portion of said medium.

10. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium, said cathode and anode having respective active surface areas contactable by said mixture, whereby said mixture is heated by said medium within said cathode for driving said mixture toward said anode, and whereby said metal addition is ionized when contacting said cathode and the ions are thereafter electrically discharged when contacting said anode, two electric terminals connected to said anode and cathode respectively to provide electric energy, an auxiliary compartment surrounding said heating chamber means, said conduit means including a source of combustion gases communicating with said combustion chamber means wherein said combustion gases are burned so as to convey heat to the gases in said chamber means, feed-back conduit means leading from said anode to said cathode for returning said ionizable metal addition, and exhaust means located beyond said anode for exhausting at least a portion of said medium.

11. A thermionic energy converter comprising a low-pressure vessel having a cathode and an anode insulated and spaced from each other, said cathode forming combustion chamber means, conduit means for introducing directly into said combustion chamber means a mixture of a fluid driving and heating medium and an ionizable metal addition finely distributed in said medium and directing said medium and said metal from said cathode to said anode, said cathode and anode having respective active surface areas contactable by said mixture, said conduit means including combustion gas supply means for supplying fuel and oxygen to said combustion chamber means so as to drive and heat the mixture of finely distributed ionizable metal, whereby said metal addition is ionized when contacting said cathode and the ions are thereafter electrically discharged when contacting said anode, two electric terminals connected to said anode and cathode respectively to provide electric energy, and exhaust means located beyond said anode for exhausting at least a portion of said medium.

12. A thermionic energy converter comprising a low-pressure vessel having a cathode and an anode insulated and spaced from each other, said cathode forming combustion chamber means having an outwardly flaring outlet which opens into said vessel, conduit means for introducing directly into said combustion chamber means a mixture of a fluid driving and heating medium and an ionizable metal addition finely distributed in said driving and heating medium, said cathode and anode having respective active surface areas contactable by said mixture, whereby said mixture is heated by said medium within said cathode for driving said mixture toward said anode, and whereby said metal addition is ionized when contacting said outlet of said cathode and the ions are thereafter electrically discharged when contacting said anode, and two electric terminals connected to said anode and cathode respectively to provide electric energy, said conduit means including a source of combustion gases communicating with said combustion chamber means and arranged with the latter so that said combustion gases are burned in said chamber means to convey heat directly to the mixture in said cathode, and feed-back conduit means leading from said anode to said conduit means for returning a portion of said mixture.

13. A thermionic energy converter comprising a low-pressure vessel having a cathode and an anode insulated and spaced from each other, said cathode forming combustion chamber means having an outwardly flaring outlet which opens into said vessel, conduit means for introducing directly into said combustion chamber means a mixture of a fluid driving and heating medium and an ionizable metal addition finely distributed in said driving and heating medium, said cathode and anode having respective active surface areas contactable by said mixture, whereby said mixture is heated by said medium within said cathode for driving said mixture toward said anode, and whereby said metal addition is ionized when contacting said outlet of said cathode and the ions are thereafter electrically discharged when contacting said anode, and two electric terminals connected to said anode and cathode respectively to provide electric energy, said conduit means including a source of combustion gases communicating with said combustion chamber means and arranged with the latter so that said combustion gases are burned in said chamber means to convey heat directly to the mixture in said cathode, said vessel having an outlet duct beyond said anode for exhausting gases from said vessel, cooler means in said outlet duct for receiving heat by heat-exchange from the exhausted gases, and feed-back conduit means leading from said outlet duct to said conduit means for recirculating a portion of said mixture.

References Cited by the Examiner

UNITED STATES PATENTS

| | | | |
|---|---|---|---|
| 1,004,170 | 9/11 | Jacoviello | 313—231 |
| 1,717,413 | 6/29 | Rudenberg | 310—11 |
| 1,916,076 | 6/33 | Rupp | 310—11 |
| 2,980,819 | 4/61 | Feaster | 310—4 |

OTHER REFERENCES

Publication: Electronics, November 1959, page 82.

Publication: Westinghouse Engineer, July 1960, pages 105 to 107.

MILTON O. HIRSHFIELD, *Primary Examiner.*

DAVID X. SLINEY, *Examiner.*